US006650700B1

(12) United States Patent
Citta et al.

(10) Patent No.: US 6,650,700 B1
(45) Date of Patent: Nov. 18, 2003

(54) DUAL PATH GHOST ELIMINATING EQUALIZER WITH OPTIMUM NOISE ENHANCEMENT

(75) Inventors: Richard W. Citta, Oak Park, IL (US); Scott M. LoPresto, Mt. Prospect, IL (US); Jingsong Xia, Mundelein, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/425,522

(22) Filed: Oct. 22, 1999

(51) Int. Cl.[7] .................................................. H03D 1/04
(52) U.S. Cl. ........................ 375/232; 375/349; 375/235
(58) Field of Search ................................ 375/229, 232, 375/235, 236, 285, 346, 350, 230, 349; 370/290, 291; 708/319, 323, 306; 333/18, 282; 379/390.02, 406.08

(56) References Cited

U.S. PATENT DOCUMENTS

| 5,533,063 A | | 7/1996 | Mitra et al. .................. 375/340 |
| 5,539,774 A | * | 7/1996 | Nobakakht et al. ......... 375/232 |
| 5,692,011 A | * | 11/1997 | Nobakakht et al. ......... 375/233 |
| 5,703,908 A | * | 12/1997 | Mammone et al. ......... 375/278 |
| 5,809,069 A | * | 9/1998 | Polley et al. ............... 375/222 |
| 5,896,306 A | | 4/1999 | Aschwanden ........ 364/724.011 |
| 5,901,174 A | * | 5/1999 | Richard ....................... 375/229 |
| 6,295,317 B1 | * | 9/2001 | Hart up et al. ............. 375/235 |
| 6,442,221 B1 | * | 8/2002 | Citta et al. .................. 375/346 |

FOREIGN PATENT DOCUMENTS

WO  WO 00/18024  3/2000

OTHER PUBLICATIONS

P. Sehier et al., "Performance Evaluation of an Oversampled RAKE Receiver", IEE Military Communications Conference, pp. 410–414 (Oct. 1994).

M. O. Sunay et al., "Probability of Error for Diversity Combining in DS CDMA Systems with Synchronization Errors", European Transactions on Telecommunications, vol. 9, No. 5, pp. 449–463 (Sep. 1998).

S. Abeta, et al., "Performance Comparison between Time––Multiplexed Pilot Channel and Parallel Pilot Channel for Coherent Rake Combining in DS–CDMA Mobile Radio", IEICE Transactions on Communications, vol. E81–B, No. 7, pp. 1417–1425 (Jul. 1998).

G. McAuliffe, "Practical Adaptive Equalizers for Data Transmission", Wescon Technical Papers, pp. 1–5, (Aug., 1969).

International Search Report in International (PCT) Application No. PCT/US00/19478, dated Nov. 6, 2000.

* cited by examiner

Primary Examiner—Chi Pham
Assistant Examiner—Dung X. Nguyen

(57) ABSTRACT

A dual path equalizer for processing blocks of data includes first and second pre-processors, first and second finite filters, first and second post-processors, and an adder. The first pre-processor applies coefficients $b_1$ to a received signal, the first finite filter applies coefficients $a_1$ to an output of the first pre-processor in order to substantially eliminate a ghost from the received signal, and the first post-processor applies coefficients $c_1$ to an output of the first finite filter. The second pre-processor applies coefficients $b_2$ to the received signal, the second finite filter applies coefficients $a_2$ to an output of the second pre-processor in order to substantially eliminate a ghost from the received signal, and the second post-processor applies coefficients $c_2$ to an output of the second finite filter. The coefficients $b_2$ are substantially the time reverse of the coefficients $b_1$, the coefficients $a_2$ are substantially the time reverse of the coefficients $a_1$, and the coefficients $c_2$ are substantially the time reverse of the coefficients $c_1$. The adder is arranged to add outputs from the first and second post-processors.

47 Claims, 11 Drawing Sheets

DUAL PATH GHOST ELIMINATING EQUALIZER WITH OPTIMUM NOISE ENHANCEMENT

TECHNICAL FIELD OF THE INVENTION

The present invention is directed to an equalizer that substantially eliminates signal ghosts of up to and including 100% ghosts and, more particularly, to a dual path equalizer with optimum noise enhancement.

BACKGROUND OF THE INVENTION

Ghosts are produced in a receiver usually because a signal arrives at the receiver through different transmission paths. For example, in a system having a single transmitter, the multipath transmission of a signal may occur because of signal reflection. That is, the receiver receives a transmitted signal and one or more reflections of the transmitted signal. As another example, the multipath transmission of a signal may occur in a system having plural transmitters that transmit the same signal to a receiver using the same carrier frequency. A network which supports this type of transmission is typically referred to as a single frequency network.

When a signal reaches a receiver through two or more different transmission paths, an interference pattern results. In the frequency domain, this interference pattern is manifested by a variable signal amplitude along the frequency axis. An interference pattern which results when the ghost is 100% is shown in FIG. 1. This interference pattern has amplitude nulls or near amplitude nulls at certain frequencies. Therefore, any information contained in the received main signal in the neighborhood of these frequencies is likely lost because the signal to noise ratio near these frequencies is below a usable threshold.

A variety of systems have been devised to deal with the problems caused by ghosts. For example, spread spectrum systems deal very adequately with the problem of a 100% ghost by spreading the transmitted data over a substantial bandwidth. Accordingly, even though a 100% ghost means that some information may be lost in the neighborhood of frequencies corresponding to the amplitude nulls, a data element can still be recovered because of the high probability that it was spread over frequencies which do not correspond to the amplitude nulls. Unfortunately, the data rate R associated with spread spectrum systems is typically too low for many applications. (The data rate R is defined as the number of data bits per Hertz of channel bandwidth.)

It is also known to use a matched filter in a receiver in order to deal with the problem of a ghost. In this approach, data is transmitted as a data vector. The matched filter correlates the received data with reference vectors corresponding to the possible data vectors that can be transmitted. Correlation of the received main signal to the reference vector corresponding to the transmitted data vector produces a large peak, and correlation of the received main signal to the other possible reference vectors produces small peaks. Accordingly, the transmitted data vector can be easily determined in the receiver. Unfortunately, the data rate R typically associated with the use of matched filters is still too low for many applications.

When high data rates are required, equalizers are often used in a receiver in order to reduce ghosts of a main signal. A classic example of a time domain equalizer is an FIR filter. An FIR filter convolves its response h(t), shown generally in FIG. 2, with a received signal. The received signal contains the main signal and the ghost of the main signal. The FIR filter produces an output having a large peak representative of the main signal. Ghosts of the main signal have small components in the output of the FIR filter. However, as shown in FIG. 2, the values $a^1$, $a^2$, $a^3$, ... of the taps of an FIR filter depend on the value of a and, in order to perfectly cancel a 100% ghost using an FIR filter, the value a of the FIR filter response must approach 1. As the value a approaches 1, the values of the taps of the FIR filter do not asymptotically decrease toward zero. Therefore, the FIR filter becomes infinitely long if a 100% ghost is to be eliminated, making the FIR filter impractical to eliminate a 100% ghost.

An example of a frequency domain equalizer 10 is shown in FIG. 3. The frequency domain equalizer 10 includes a Fast Fourier Transform (FFT) module 12 which performs a Fast Fourier Transform on the received signal in order to transform the received signal to the frequency domain. A multiplier 14 multiplies the frequency domain output of the FFT module 12 by a compensation vector which includes a row of coefficients $A_i$. An inverse FFT module 16 performs an inverse FFT on the multiplication results from the multiplier 14 in order to transform the multiplication results to the time domain.

FIG. 4 illustrates an exemplary set of coefficients $A_i$ which may be used by the frequency domain equalizer 10. The coefficients $A_i$ are chosen so that, when they and the FFT of the received signal are multiplied by the multiplier 14, the coefficients $A_i$ cancel the ghost in the received signal leaving only the main signal. It should be noted that the coefficients $A_i$ should have infinite amplitudes at the frequencies where the interference pattern has a zero amplitude. However, the coefficients $A_i$ cannot be made infinite as a practical matter. Accordingly, the coefficients $A_i$ are cut off at these frequencies, which means that information in the received main signal is lost at the cut off frequencies so that the output of the inverse FFT module 16 becomes only an approximation of the transmitted data.

Moreover, it is known to use empty guard intervals between the vectors employed in the frequency domain equalizer 10 of FIG. 3. The guard intervals are shown in FIG. 5 and are provided so that received vectors and ghosts of the received vectors do not overlap because such an overlap could otherwise cause intersymbol interference. Thus, the guard intervals should be at least as long as the expected ghosts. It is also known to use cyclic extensions of the vectors in order to give the received main signal an appearance of periodicity. Accordingly, a Fast Fourier Transform of the received signal and a Fourier Transform of the received signal appear identical.

U.S. application Ser. No. 09/158,730 filed Sep. 22, 1998 now U.S. Pat. No. 6,442,221 discloses a vector domain equalizer which effectively eliminates ghosts up to 100% by distributing the transmitted data in both time and frequency so that the vectors are essentially random in the time and frequency domains. Accordingly, in a heavily ghosted channel, all data can be recovered with small noise enhancement, and any enhanced noise that does exist is near white.

As shown in FIG. 6, the vector domain equalizer 20 disclosed in this application includes an inverse vector domain transform 22 and a vector domain transform 24 which are separated by a channel 26. The inverse vector domain transform 22 performs a matrix multiplication between an input data block and a transform matrix so as to distribute each data element in the input data block to each element in an output data block. The vector domain transform 24 performs a matrix multiplication between the received signal and a plurality of receiver vectors. The vectors of the vector domain transform 24 are adjusted according to channel distortion such that, in the presence of channel distortion, the data of the original input data block is recovered.

The invention of U.S. application Ser. No. 09/158,730 now U.S. Pat. No. 6,442,221 works quite well. However, the number of calculations performed by the transforms shown in FIG. 6 increases in accordance with $n^2$ as n increases, where n is the number of data elements in a data block. U.S. application Ser. No. 09/283,877 filed Apr. 1, 1999 discloses an equalizer which effectively eliminates ghosts up to 100% but which uses fewer calculations. This equalizer 30 is shown in FIG. 7 and includes a pre-processor 32, a finite filter 34, and a post-processor 36. The finite filter 34 may be implemented as a Fast Fourier Transform, a multiplier, and an inverse Fast Fourier Transform. The pre-processor 32 of the equalizer 30 multiplies the data input block received from the channel by coefficients b in order to modulate the received main signal and its ghost so that the ghost is less than the received main signal. The finite filter 34 applies coefficients a in order to eliminate the ghost from the multiplication results of the pre-processor 32, and the post-processor 36 applies coefficients c to the output of the finite filter 34. The post-processor 36 reverses the effects of the modulation imposed by the pre-processor 32 and applies a window function to the output of the finite filter 34. This window function has a duration which is substantially equal to the duration of a data input block. The number of calculations performed by the finite filter 34 of FIG. 7 increases in accordance with nlogn as n increases. Thus, the calculations performed by the equalizer 30 are considerably fewer than the calculations performed by the transforms of FIG. 6.

It is noted that the equalizer disclosed in FIG. 7 is a single path equalizer. This single path equalizer produces an output which is a solution to the problem of recovering data in the presence of even a 100% ghost. The present invention, however, is directed to a dual path equalizer where each path produces an output which is a solution, and where the outputs of the two paths are added together in order to produce better signal to noise performance as compared to a single path equalizer.

SUMMARY OF THE INVENTION

In accordance with one aspect of the present invention, a dual path equalizer for processing blocks of data comprises first and second pre-processors, first and second finite filters, first and second post-processors, and an adder. The first pre-processor applies coefficients $b_1$ to a received signal. The first finite filter applies coefficients $a_1$ to an output of the first pre-processor in order to substantially eliminate a ghost from the received signal. The first post-processor applies coefficients $c_1$ to an output of the first finite filter. The second pre-processor applies coefficients $b_2$ to the received signal, and the coefficients $b_2$ are substantially the time reverse of the coefficients $b_1$. The second finite filter applies coefficients $a_2$ to an output of the second pre-processor in order to substantially eliminate a ghost from the received signal, and the coefficients $a_2$ are substantially the time reverse of the coefficients $a_1$. The second pre-processor applies coefficients $c_2$ to an output of the second finite filter, and the coefficients $c_2$ are substantially the time reverse of the coefficients $c_1$. The adder is arranged to add outputs from the first and second post-processors.

In accordance with another aspect of the present invention, a dual path equalizer for processing blocks of data comprises first and second pre-processors, first and second finite filters, first and second post-processors, and an adder. The first pre-processor applies coefficients $b_1$ to a received signal. The first finite filter applies coefficients $a_1$ to an output of the first pre-processor in order to substantially eliminate a ghost from the received signal. The first post-processor applies coefficients $c_1$ to an output of the first finite filter. The second pre-processor applies coefficients $b_2$ to the received signal, and $b_2 \neq b_1$. The second finite filter applies coefficients $a_2$ to an output of the second pre-processor in order to substantially eliminate a ghost from the received signal, and $a_2 \neq a_1$. The second post-processor applies coefficients $c_2$ to an output of the second finite filter, and $c_1 \neq c_2$. The adder is arranged to add outputs from the first and second post-processors.

In accordance with yet another aspect of the present invention, a method of substantially eliminating a ghost of a received main signal and reducing noise enhancement comprises the following steps: a) processing the received main signal and the ghost along a first path so as to substantially eliminate the ghost; b) processing the received main signal and the ghost along a second path so as to substantially eliminate the ghost, wherein the processing along the first path and the processing along the second path are arranged so as to maintain the received main signal in the first and second paths correlated and to maintain noise in the first and second paths at least partially uncorrelated; and, c) adding the correlated received main signals and the at least partially uncorrelated noise from the first and second paths.

BRIEF DESCRIPTION OF THE DRAWINGS

These and other features and advantages of the present invention will become more apparent from a detailed consideration of the invention when taken in conjunction with the drawings in which.

Figure 1:
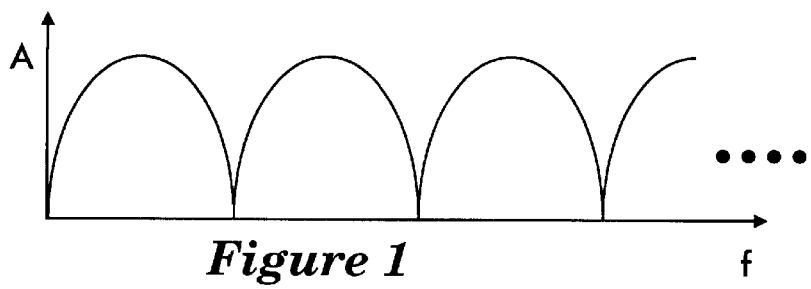
FIG. 1 shows an interference pattern which could result when two signals in the same frequency band are received by a receiver at substantially the same time.
Figure 2:
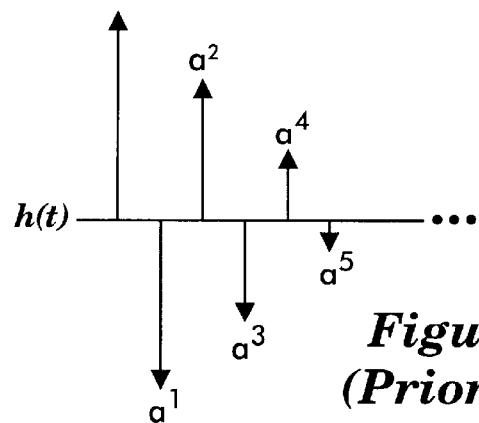
FIG. 2 illustrates the response of an FIR filter which is commonly used as a time domain equalizer in a receiver in order to eliminate ghosts.
Figure 3:
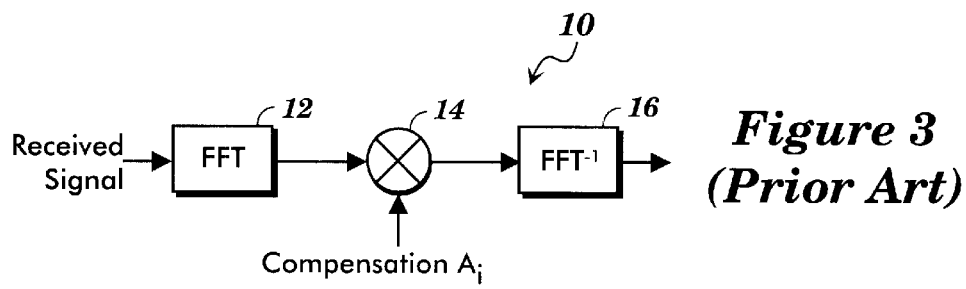
FIG. 3 illustrates a frequency domain equalizer which is used in a receiver in order to eliminate ghosts.
Figure 4:
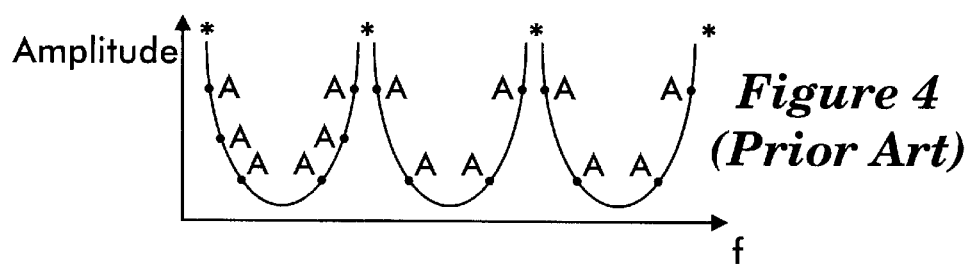
FIG. 4 illustrates an exemplary set of coefficients $A_i$ that are used by the frequency domain equalizer of FIG. 3 in order to cancel ghosts.
Figure 5:
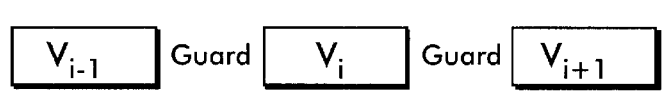
FIG. 5 illustrates guard intervals which may be used between transmitted vectors in systems employing equalizers.
Figure 6:
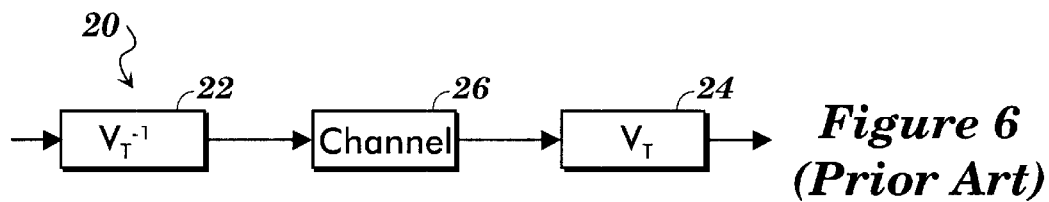
FIG. 6 illustrates an equalizer which includes a vector domain transform pair (i.e., a vector domain transform and an inverse vector domain transform)
Figure 7:
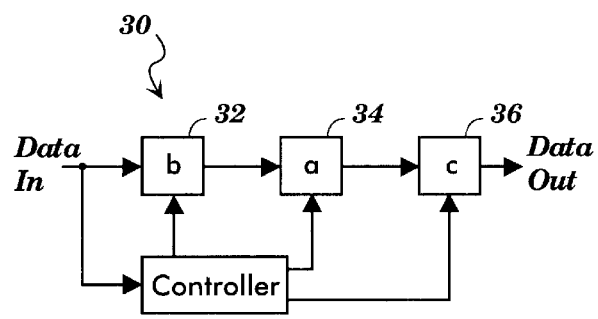
FIG. 7 illustrates a single path equalizer having a pre-processor, a finite filter, and a post-processor.
Figure 8:
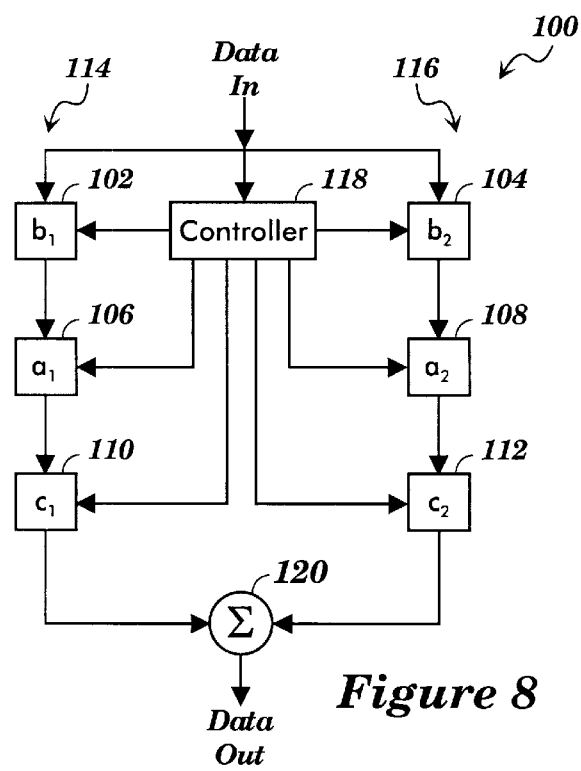
FIG. 8 illustrates a dual path equalizer in accordance with a first embodiment of the present invention.
Figure 14:
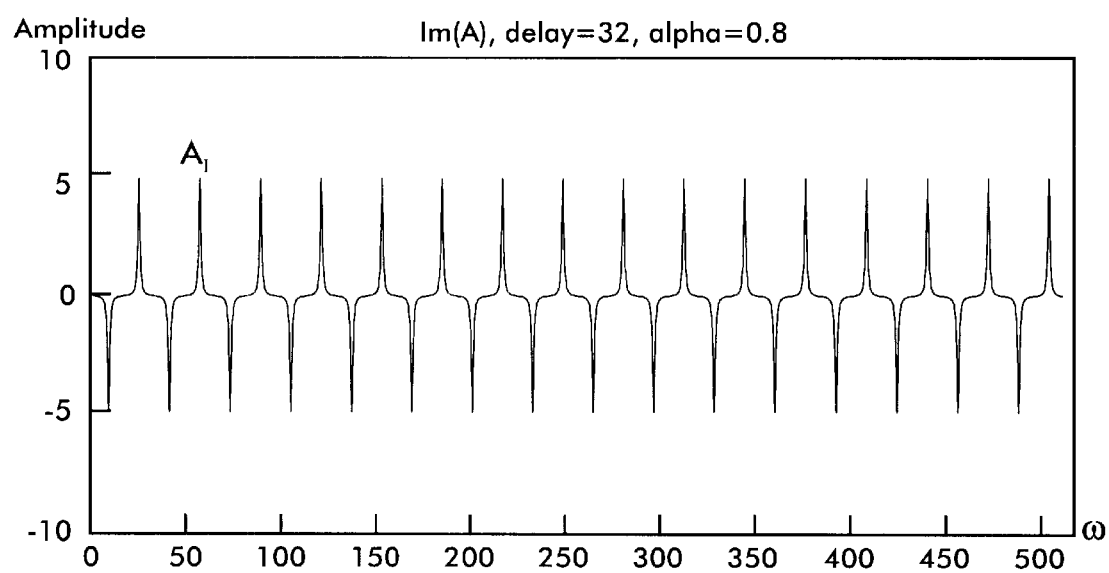
Figure 15:
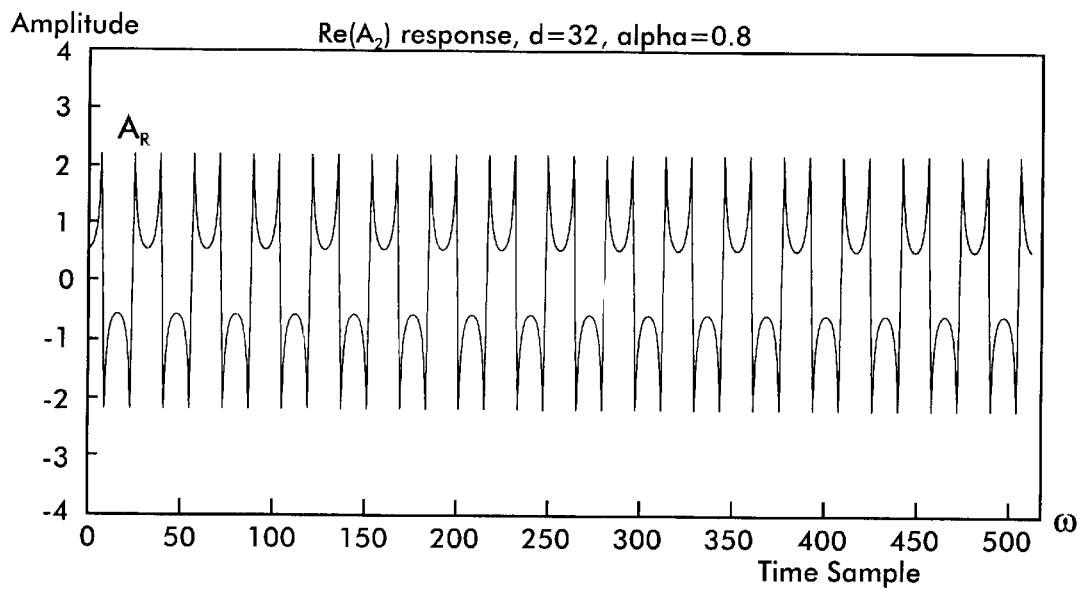
Figure 16:
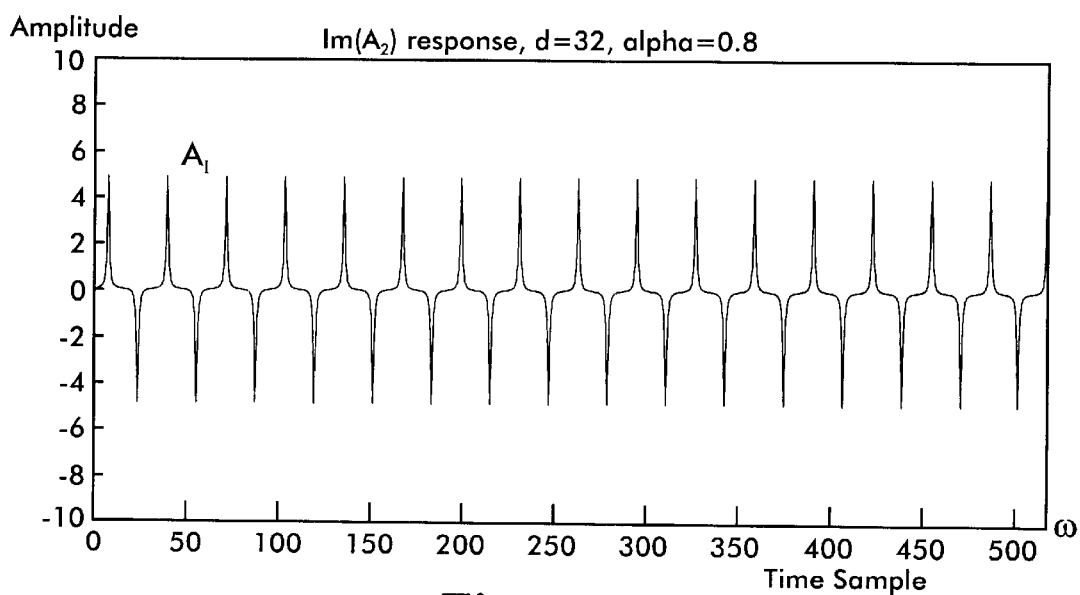
Figure 17:
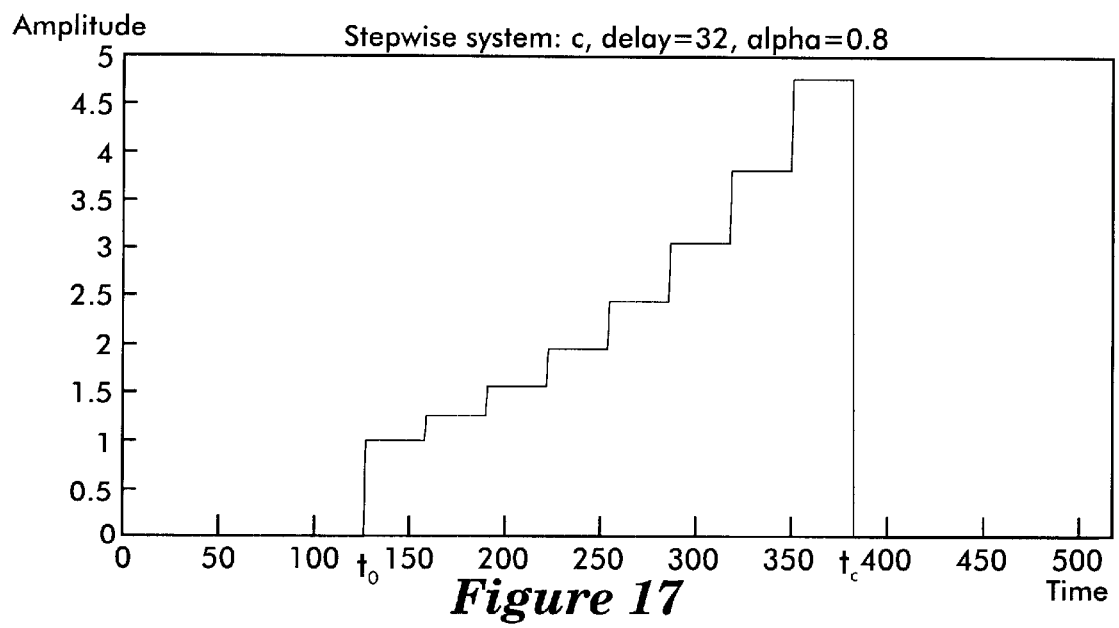
Figure 18:
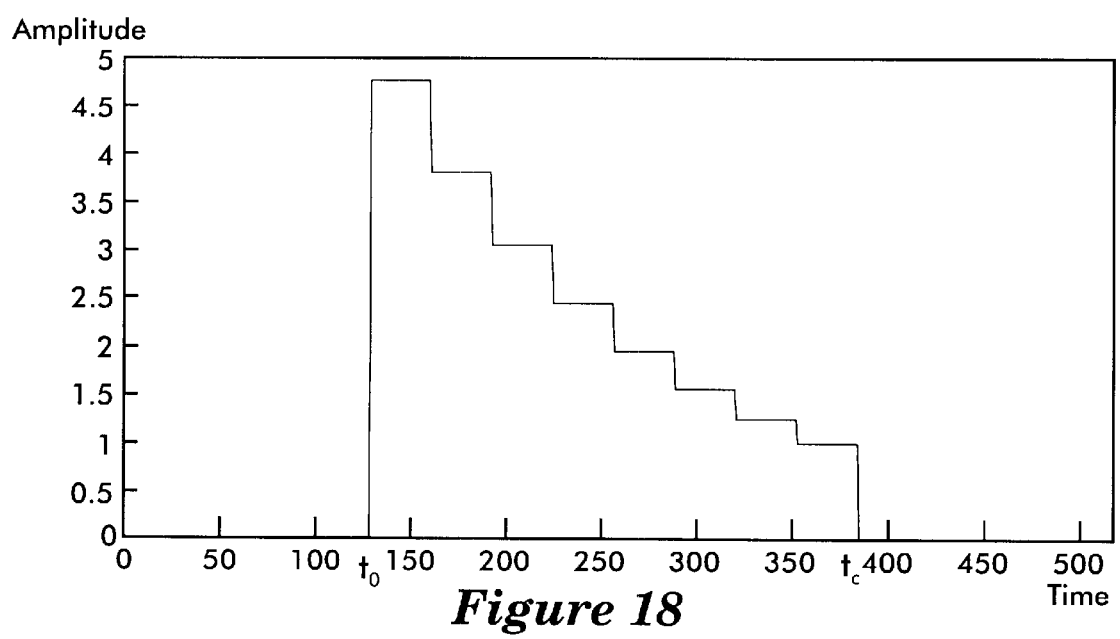
Figure 19:
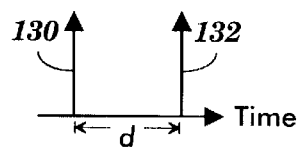
Figure 20:
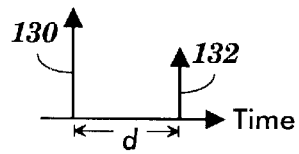
Figure 21:
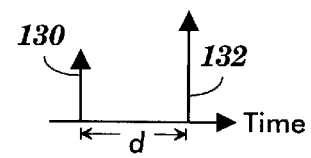
Figure 22:
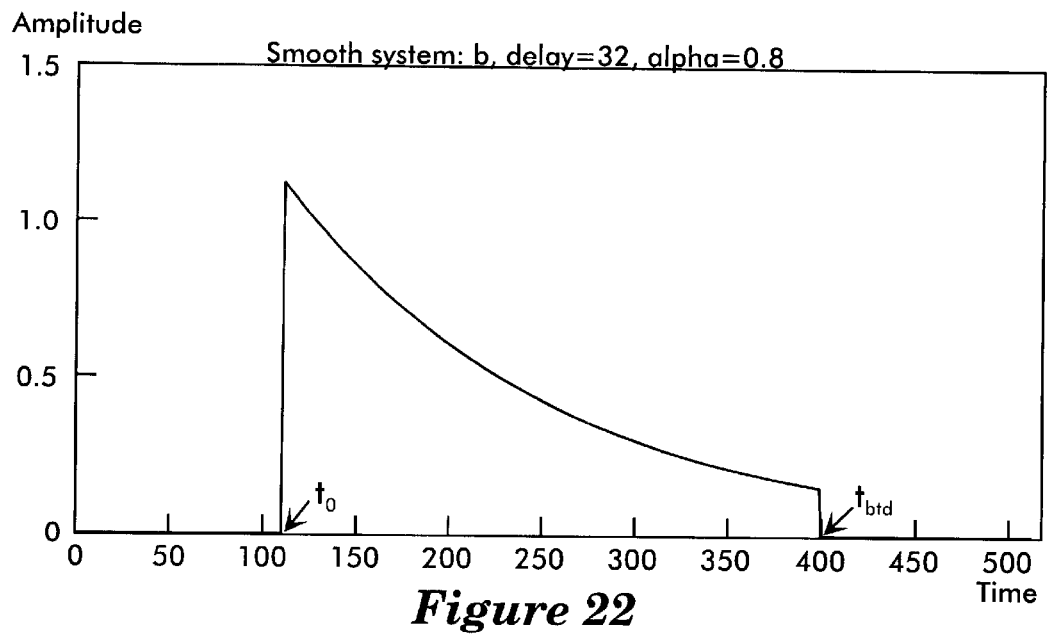
Figure 23:
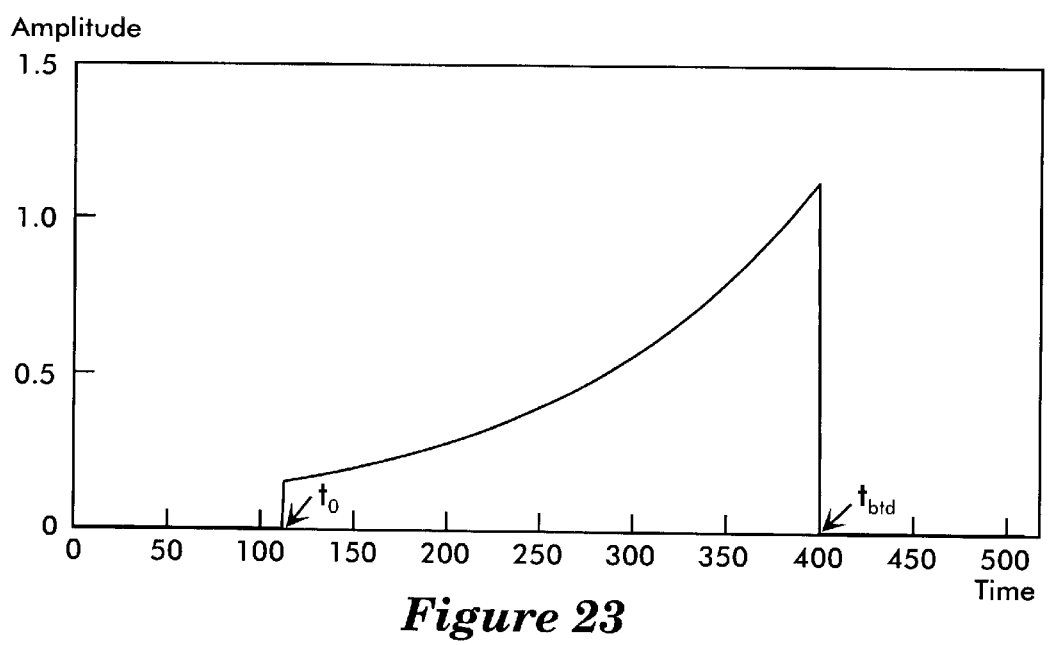
Figure 24:
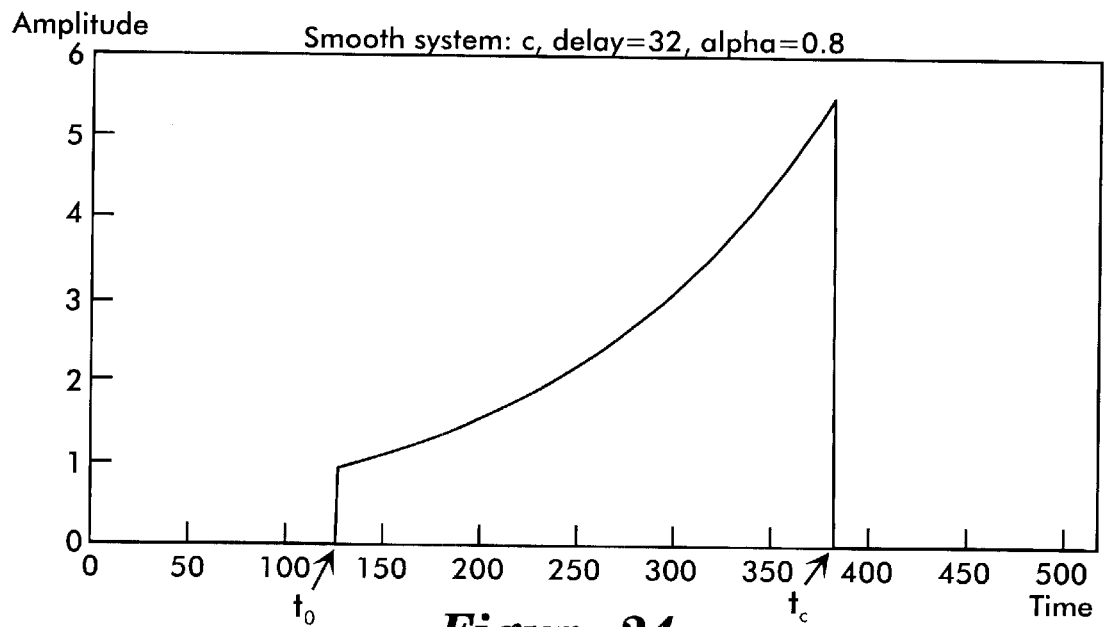
Figure 25:
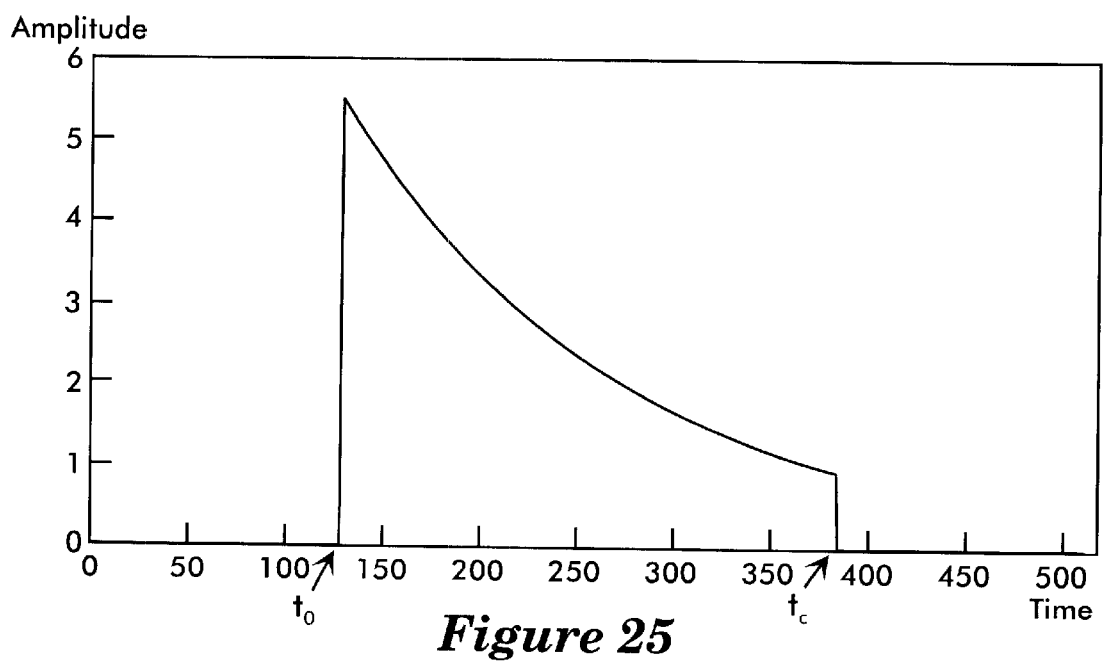
Figure 26:
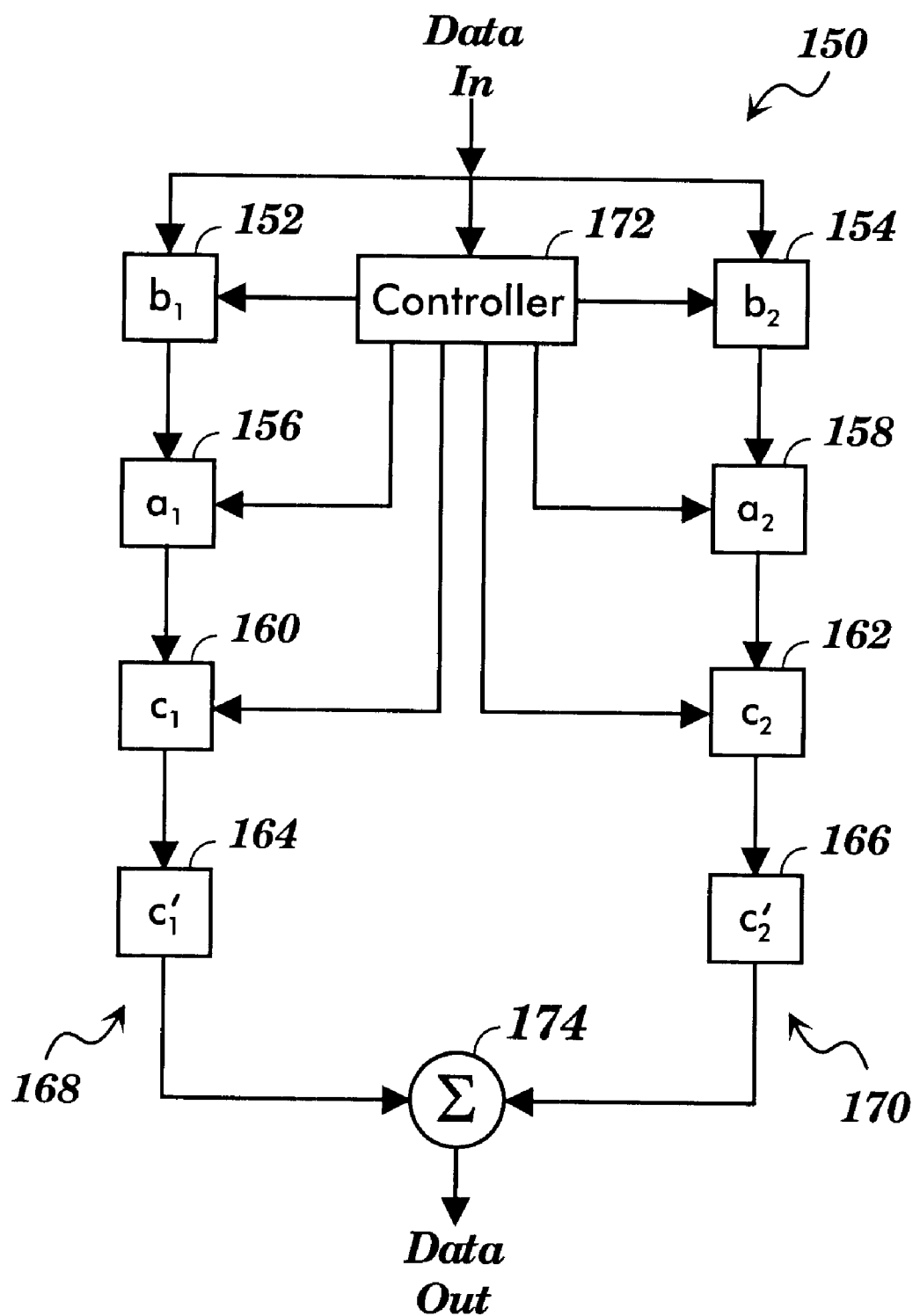
Figure 27:
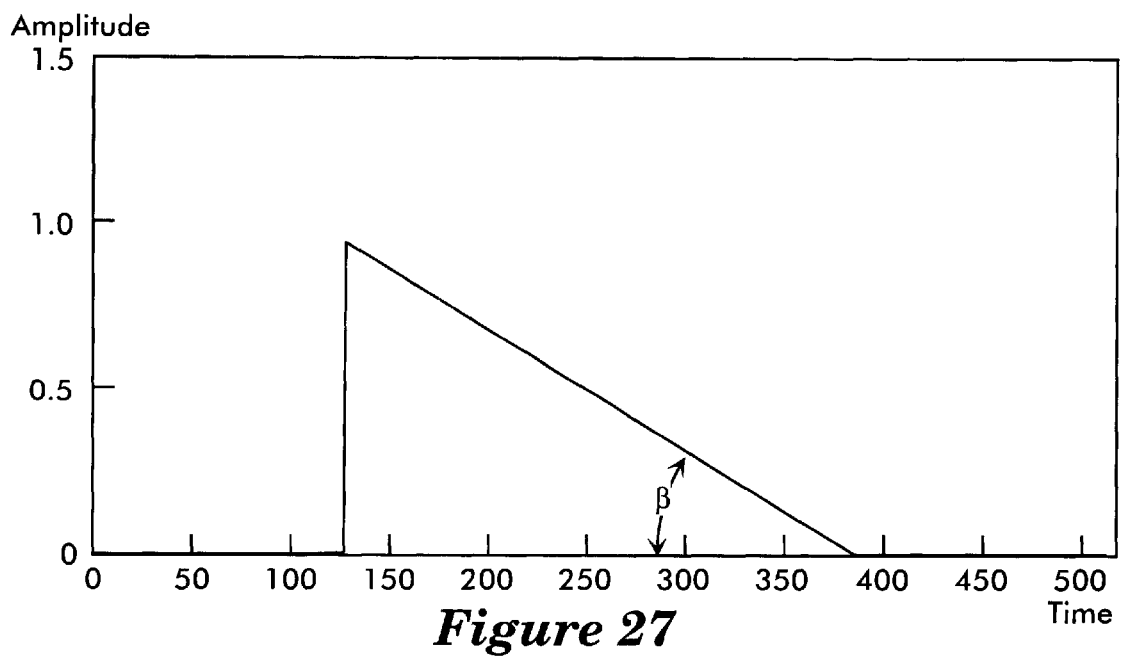
Figure 28:
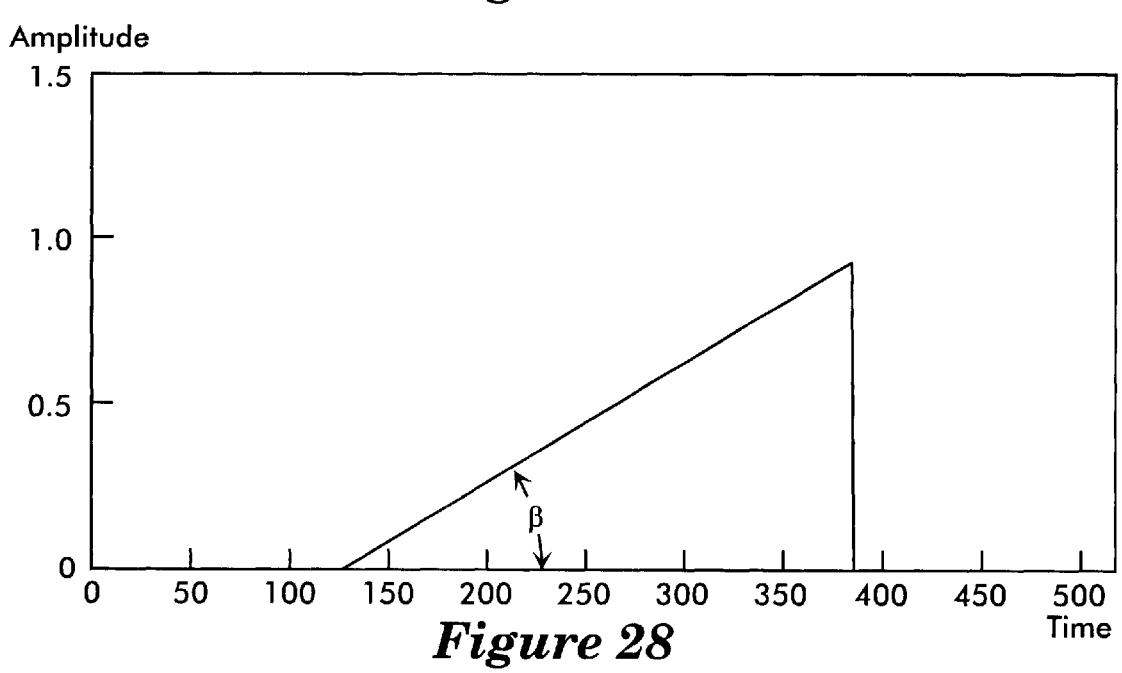
Figure 29:
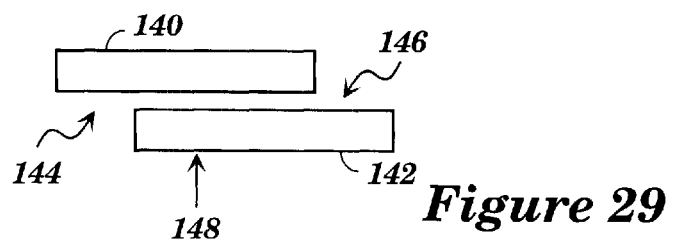

13 illustrates the real part of a frequency domain response of the first finite filter of the dual path equalizer shown in FIG. 8;

FIG. 14 illustrates the imaginary part of the frequency domain response of the first finite filter of the dual path equalizer shown in FIG. 8;

FIG. 15 illustrates the real part of a frequency domain response of a second finite filter of the dual path equalizer shown in FIG. 8;

FIG. 16 illustrates the imaginary part of the frequency domain response of the second finite filter of the dual path equalizer shown in FIG. 8;

FIG. 17 illustrates a first embodiment of a response of a first post-processor of the dual path equalizer shown in FIG. 8;

FIG. 18 illustrates a first embodiment of a response of a second post-processor of the dual path equalizer shown in FIG. 8;

FIG. 19 is a time domain illustration of a received main signal and its ghost;

FIG. 20 illustrates the output of the first pre-processor response in the time domain;

FIG. 21 illustrates the output of the second pre-processor response in the time domain;

FIG. 22 illustrates a second embodiment of the response of the first pre-processor of the dual path equalizer shown in FIG. 8;

FIG. 23 illustrates a second embodiment of the response of the second pre-processor of the dual path equalizer shown in FIG. 8;

FIG. 24 illustrates a second embodiment of the response of the first post-processor of the dual path equalizer shown in FIG. 8;

FIG. 25 illustrates a second embodiment of the response of the second post-processor of the dual path equalizer shown in FIG. 8;

FIG. 26 illustrates a second embodiment of a dual path equalizer in accordance with the present invention;

FIG. 27 illustrates a response of a first multiplier of the dual path equalizer shown in FIG. 26;

FIG. 28 illustrates a response of a second multiplier of the dual path equalizer shown in FIG. 26; and, FIG. 29 is a diagram useful in explaining the second embodiment illustrated in FIG. 26.

DETAILED DESCRIPTION

A dual path equalizer 100 according to the present invention is shown in FIG. 8 and includes first and second pre-processors 102 and 104, first and second finite filters 106 and 108, and first and second post-processors 110 and 112. The first pre-processor 102, the first finite filter 106, and the first post-processor 110 form a first path 114 of the dual path equalizer 100, and the second pre-processor 104, the second finite filter 108, and the second post-processor 112 form a second path 116 of the dual path equalizer 100.

The first pre-processor 102 of the dual path equalizer 100 multiplies the signal received from the channel by coefficients $b_1$. The signal received from the channel is designated in FIG. 8 as Data In. The first pre-processor 102 is a modulation operation that modulates the received main signal and its ghost so that the ghost is less that the received main signal. Accordingly, the ghost is no longer a 100% ghost.

The first finite filter 106 applies coefficients $a_1$ to the multiplication results of the first pre-processor 102. The first finite filter 106 may be implemented as a convolver or as a Fast Fourier Transform, a multiplier, and an inverse Fast Fourier Transform. If the first finite filter 106 is a convolver, the first finite filter 106 convolves the multiplication results from the first pre-processor 102 with the coefficients $a_1$. If the first finite filter 106 is a Fast Fourier Transform, a multiplier, and an inverse Fast Fourier Transform, the Fast Fourier Transform transforms the multiplication results from the first pre-processor 102 to the frequency domain, the multiplier multiplies the coefficients $A_1$ to the frequency domain output of the Fast Fourier Transform, and the inverse Fast Fourier Transform transforms the output from the multiplier to the time domain. (Upper case letters are used to denote the frequency domain and lower case letters are used to denote the time domain.) The convolution performed by the convolver or the multiplication performed by the multiplier eliminates the ghost from the multiplication results of the first pre-processor 102.

The first post-processor 110 multiplies the output from the first finite filter 106 by coefficients $c_1$ so that the output of the first post-processor 110 is the data transmitted into the channel. The output of the first post-processor 110 represents, by itself, a solution to the problem of channel distortion such as a 100% ghost. The first post-processor 110 reverses the effects of the modulation imposed by the first pre-processor 102 and applies a window function to the output of the first finite filter 106. This window function has a duration which is substantially equal to the duration of a Data In block.

The second pre-processor 104 of the dual path equalizer 100 multiplies the signal received from the channel by coefficients $b_2$. The coefficients $b_2$ are substantially the time reverse (or mirror image) of the coefficients $b_1$. The second pre-processor 104, like the first pre-processor 102, is a modulation operation that modulates the received main signal and its ghost so that the ghost is greater than the received main signal. Accordingly, the ghost is no longer a 100% ghost.

The second finite filter 108 applies coefficients $a_2$ to the multiplication results of the second pre-processor 104. The coefficients $a_2$ are substantially the time reverse of the coefficients $a_1$. The second finite filter 108 may be implemented as a convolver or as a Fast Fourier Transform, a multiplier, and an inverse Fast Fourier Transform. If the second finite filter 108 is a convolver, the second finite filter 108 convolves the multiplication results from the second pre-processor 104 with the coefficients $a_2$. If the second finite filter 108 is a Fast Fourier Transform, a multiplier, and an inverse Fast Fourier Transform, the Fast Fourier Transform transforms the multiplication results from the second pre-processor 104 to the frequency domain, the multiplier multiplies the coefficients $A_2$ to the frequency domain output of the Fast Fourier Transform, and the inverse Fast Fourier Transform transforms the output from the multiplier to the time domain. The convolution performed by the convolver or the multiplication performed by the multiplier eliminates the ghost from the multiplication results of the second pre-processor 104.

The second post-processor 112 multiplies the output from the second finite filter 108 by coefficients $c_2$ so that the output of the second post-processor 112 is the data transmitted into the channel. The coefficients $c_2$ are substantially the time reverse of the coefficients $c_1$. The output of the second post-processor 112 also represents, by itself, a solution to the problem of channel distortion such as a 100% ghost. The second post-processor 112 reverses the effects of the modulation imposed by the second pre-processor 104 and applies a window function to the output of the second finite filter 108. This window function has a duration which is substantially equal to the duration of a Data In block.

A controller 118 is provided to measure the time interval, d, separating the received main signal and its ghost. As discussed below, the interval d may be used in shaping the coefficients $b_1$, $a_1$, $c_1$, $b_2$, $a_2$, and $c_2$. The controller 118 supplies the coefficients $b_1$ to the first pre-processor 102, supplies the coefficients $a_1$ or $A_1$ to the first finite filter 106 depending upon whether the first finite filter 106 is a convolver or a Fast Fourier Transform, a multiplier, and an inverse Fast Fourier Transform, and supplies the coefficients $c_1$ to the first post-processor 110. Moreover, the controller 118 supplies the coefficients $b_2$ to the second pre-processor 104, supplies the coefficients $a_2$ or $A_2$ to the second finite filter 108 depending upon whether the second finite filter 108 is a convolver or a Fast Fourier Transform, a multiplier, and an inverse Fast Fourier Transform, and supplies the coefficients $c_2$ to the second post-processor 112. The controller 118 also synchronizes the first and second pre-processors 102 and 104, the first and second finite filters 106 and 108, and the first and second post-processor 110 and 112 to each block of data moving through the dual path equalizer 100. Each two blocks of data may be separated by a guard interval.

The outputs of the first and second post-processors 110 and 112 are added by an adder 120. Because the ghost free main signals emerging from each of the first and second paths 114 and 116 are correlated, the addition of these ghost free main signals produces a result which is about twice the amplitude and four times the power of the ghost free main signal emerging from just one of the first and second paths 114 and 116. That is, if $S_0$ designates the main received signal received from the channel, then the output main signal $S_{O1}$ emerges from the first path 114 and the output main signal $S_{O2}$ emerges from the second path 116. The output main signals $S_{O1}$ and $S_{O2}$ are correlated so that, when they are added by the adder 120, their combined power is about four times the power of the main received signal $S_0$.

On the other hand, noise (such as white noise), which is more randomly distributed, is less correlated so that, when the outputs of the first and second post-processors 110 and 112 are added, the noise adds to a less extent than does the ghost free main signals. That is, if $N_0$ designates the noise received from the channel, then the output noise $N_{O1}$ emerges from the first path 114 and the output noise $N_{O2}$ emerges from the second path 116. The output noises $N_{O1}$ and $N_{O2}$ are only partially correlated so that, when they are added by the adder 120, their combined power is in the range of $N_0 < N_{O1} + N_{O2} < 4N_0$.

Accordingly, although each of the outputs of the first and second post-processors 110 and 112 is a solution to channel distortion such as the 100% ghost problem and could be used alone to adequately deal with ghosts up to and including a 100% ghost, the signal to noise ratio of a dual path equalizer is improved over a single path equalizer.

Figure 9:
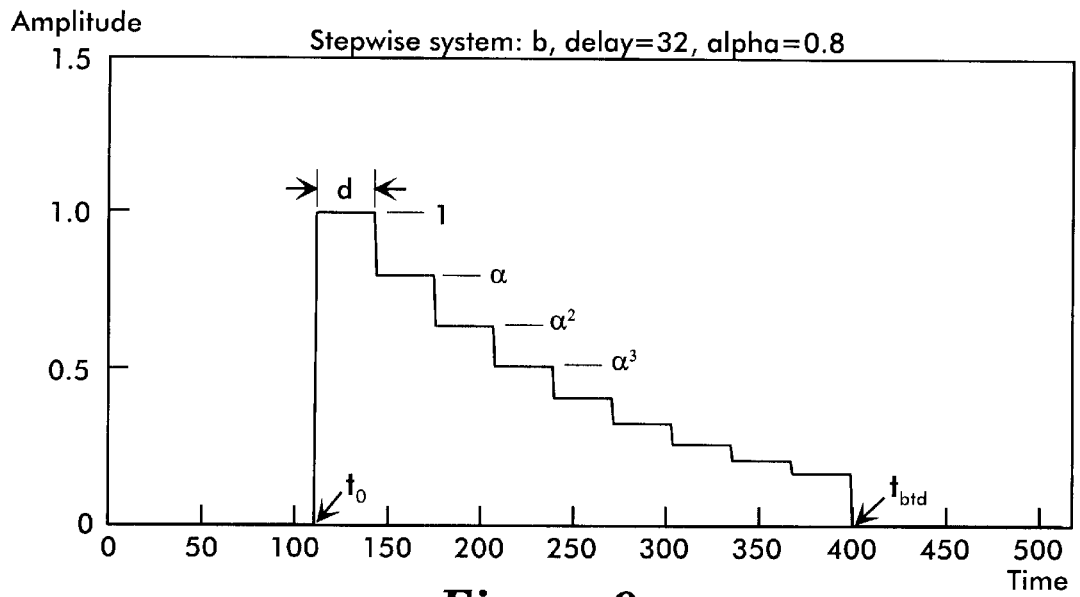
FIG. 9 illustrates a first embodiment of the response of a first pre-processor of the dual path equalizer shown in FIG. 8.

The coefficients $b_1$ applied by the first pre-processor 102 may be discrete steps as shown by way of example in FIG. 9. Each of these steps has a width along the time axis equal to the interval d. Also, the ratio of the amplitude of any one step to the amplitude of the next previous step is $\alpha$, where $\alpha$ is a constant and is less than one. In the example shown in FIG. 9, $\alpha$ is 0.8.

Moreover, the coefficients $b_1$ are applied as a block to each Data In block and, therefore, the difference between $t_0$ at the beginning of the block of coefficients b and $t_{b+d}$ at the end of the block of coefficients $b_1$ is commensurate with the length in time of a Data In block plus the interval d separating the received main signal and its ghost. For example, if each Data In block has a duration of 256 samples times and d has a duration of 32 sample times, then the difference between $t_0$ and $t_{b+d}$ is 288 sample times, as shown in FIG. 9. In addition, there should be an appropriate guard interval on each side of the block of coefficients $b_1$.

Figure 10:
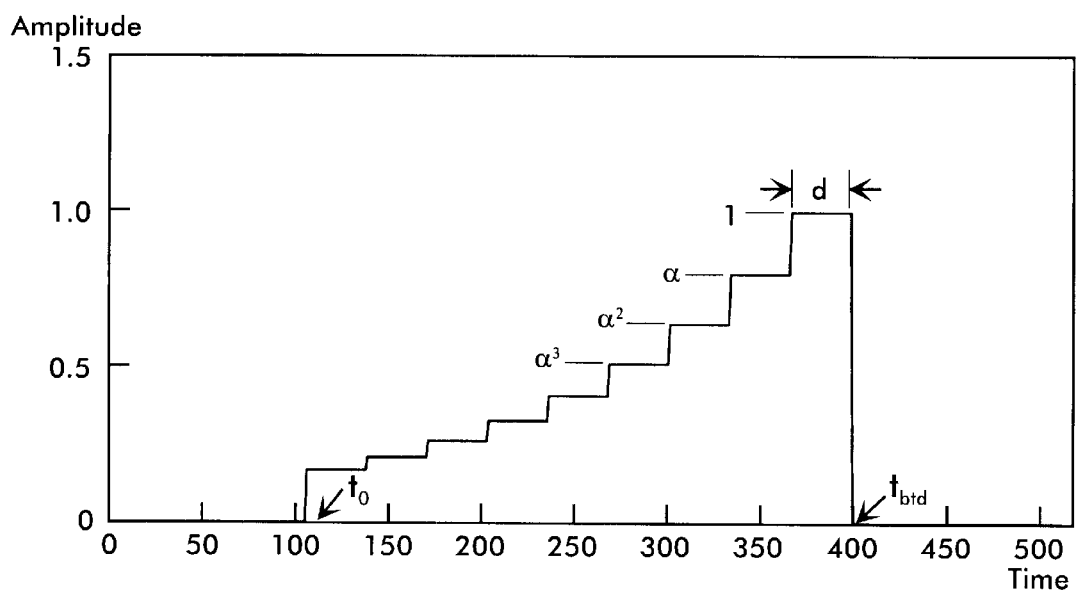
FIG. 10 illustrates a first embodiment of the response of a second pre-processor of the dual path equalizer shown in FIG. 8.

The coefficients $b_2$ applied by the second pre-processor 104, as discussed above, are substantially the time reverse of the coefficients $b_1$ and, therefore, may also be discrete steps as shown by way of example in FIG. 10. Each of these steps has a width along the time axis equal to the interval d. Also, the ratio of the amplitude of any one step to the amplitude of the next previous step is $1/\alpha$. In the example shown in FIG. 10, $1/\alpha$ is 1.25.

Moreover, the coefficients $b_2$ are applied as a block to each Data In block and, therefore, the difference between $t_0$ at the beginning of the block of coefficients $b_2$ and $t_{b+d}$ at the end of the block of coefficients $b_2$ is commensurate with the length in time of a Data In block plus the interval d. For example, if each Data In block has a duration of 256 samples times and d has a duration of 32 sample times, then the difference between $t_0$ and $t_{b+d}$ is 288 sample times, as shown in FIG. 10. In addition, there should be an appropriate guard interval on each side of the block of coefficients $b_2$.

It is noted that the coefficients $b_1$ and the coefficients $b_2$ modulate both the received main signal and its ghost, so that the amplitude of the ghost in the corresponding first and second paths 114 and 116 after application of the coefficients $b_1$ and the coefficients $b_2$ is unequal to the amplitude of the received main signal. Thus, if a received main signal 130 and its ghost 132 are shown in FIG. 19 as impulses separated by the interval d along the time axis, the received main signal 130 and its ghost 132 may have the appearance shown in FIG. 20 after application of the coefficients $b_1$. Similarly, the received main signal 130 and its ghost 132 may have the appearance shown in FIG. 21 after application of the coefficients $b_2$. It is also noted that the coefficients $b_1$ and the coefficients $b_2$ perform a window function in the sense that any energy received in the intervals outside of the Data In block plus the interval d is eliminated.

Figure 11:
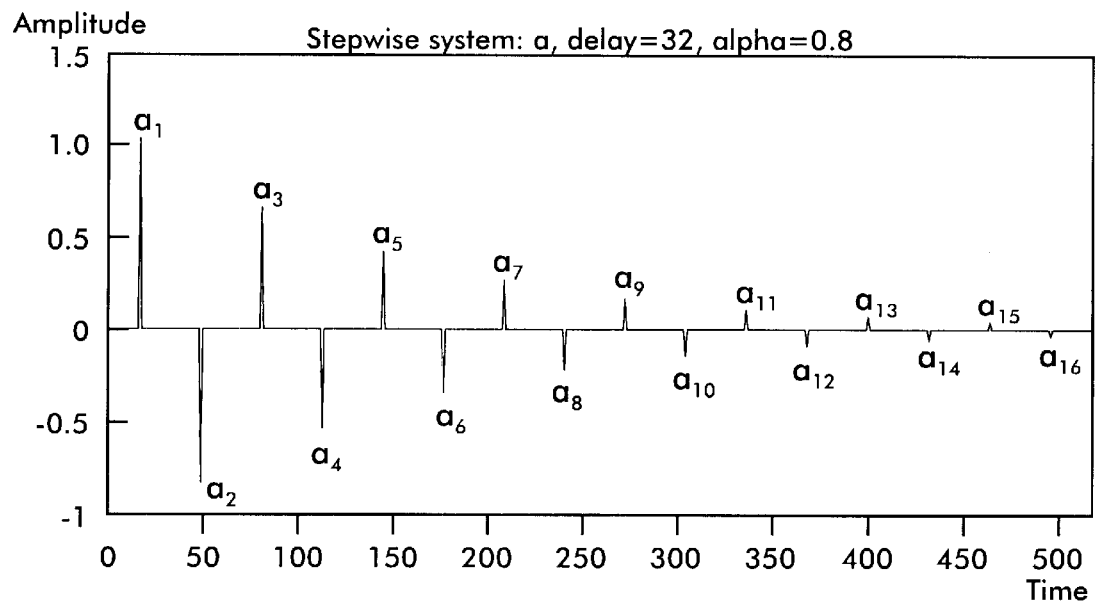
FIG. 11 illustrates a time domain response of a first finite filter of the dual path equalizer shown in FIG. 8.

The coefficients $a_1$ applied by the first finite filter 106 (assuming the first finite filter 106 is a convolver) are shown in FIG. 11 by way of example. As can be seen from FIG. 11, the coefficients $_1$ are applied as in the case of an FIR filter. Each adjacent pair of these coefficients are separated by the interval d. Also, the ratio of the magnitude of any one coefficient to the magnitude of the next previous coefficient is the constant $\alpha$. Because $\alpha$ is less than one, the magnitudes of the coefficients $a_1$ asymptotically decrease toward zero. Although the coefficients $a_1$ could be shorter than or equal to a Data In block, the coefficients $a_1$ preferably occupy a space in time that is up to twice as long as a Data In block. For example, if a Data In block has a duration of 256 sample times, then the coefficients $a_1$ preferably have a duration of up to 512 sample times. As a result of the application of the coefficients $a_1$ by the first finite filter 106, the ghost in the output from the first pre-processor 102 is eliminated.

Figure 12:
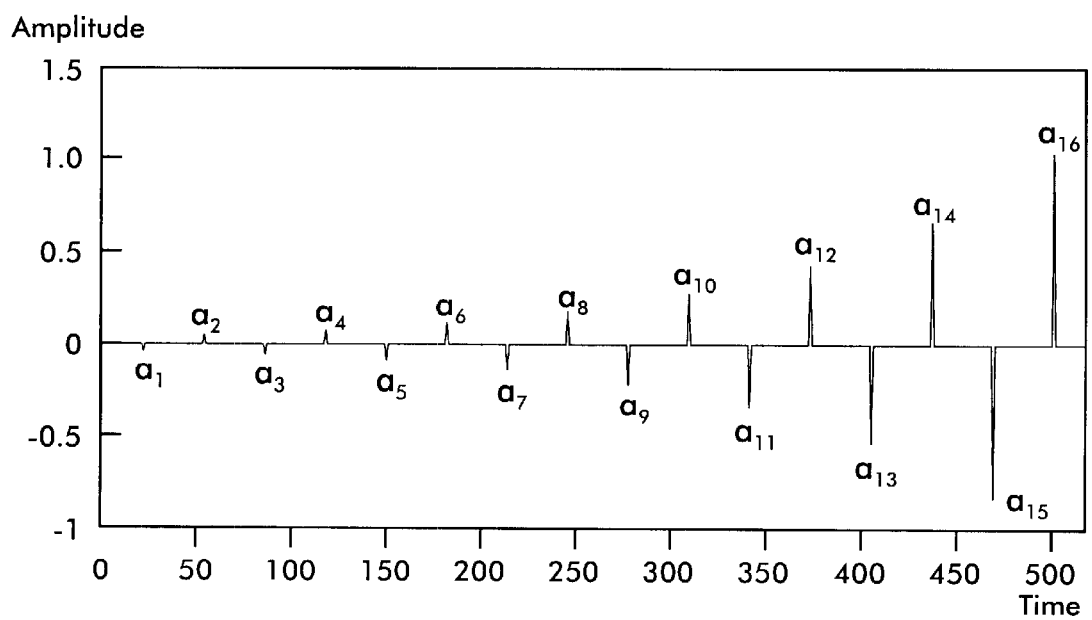
FIG. 12 illustrates a time domain response of a second finite filter of the dual path equalizer shown in FIG. 8; FIG.

The coefficients $a_2$ applied by the second finite filter 108 (assuming the second finite filter 108 is a convolver) are substantially the time reverse of the coefficients $a_1$ and are shown in FIG. 12 by way of example. As can be seen from FIG. 12, the coefficients $a_2$ are applied as in the case of an FIR filter. Each adjacent pair of these coefficients are separated by the interval d. Also, the ratio of the magnitude of any one coefficient to the magnitude of the next previous coefficient is the constant $1/\alpha$. Because $1/\alpha$ is greater than one, the magnitudes of the coefficients $a_2$ asymptotically increase. The coefficients $a_2$ preferably occupy a space in time that is twice as long as a Data In block. For example, if a Data In block has a duration of 256 sample times, then the coefficients $a_2$ preferably have a duration of up to 512 sample times. As a result of the application of the coefficients $a_2$ by the second finite filter 108, the ghost in the output from the second pre-processor 104 is eliminated.

Figure 13:
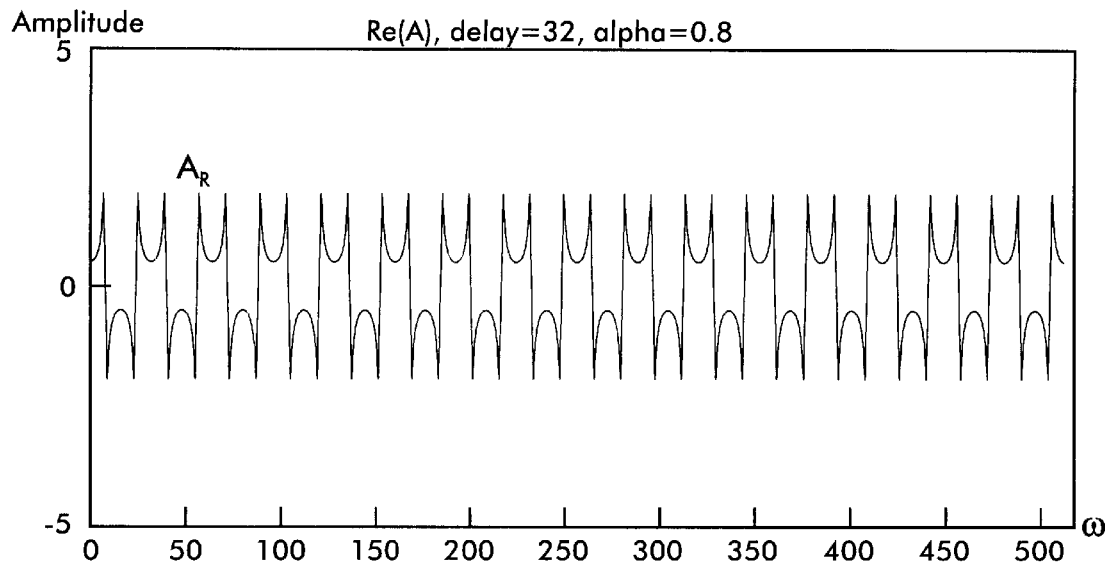

The coefficients $A_1$ applied by the first finite filter 106 (assuming the first finite filter 106 is a Fast Fourier Transform, a multiplier, and an inverse Fast Fourier Transform) are shown in FIGS. 13 and 14 by way of example. Because the output of a Fast Fourier Transform is complex, the coefficients $A_1$ must also be complex. Accordingly, the coefficients $A_1$ have a real part shown in FIG. 13 and an imaginary part shown in FIG. 14. As can be seen from FIGS. 13 and 14, the coefficients $A_1$ are based upon the interval d and the ratio $\alpha$. Again, the duration of each of the real and imaginary parts of the coefficients $A_1$ is preferably twice as long as the duration of a Data In block. As a result of the application of the coefficients $A_1$ by the first finite filter 106, the ghost in the output from the first pre-processor 102 is eliminated.

The coefficients $A_2$ applied by the second finite filter 108 (assuming the second finite filter 108 is a Fast Fourier Transform, a multiplier, and an inverse Fast Fourier Transform) are shown in FIGS. 15 and 16 by way of example. The coefficients $A_2$ have a real part shown in FIG. 15 and an imaginary part shown in FIG. 16. As can be seen from FIGS. 15 and 16, the coefficients $A_2$ are based upon the interval d and the ratio $1/\alpha$. Again, the duration of each of the real and imaginary parts of the coefficients $A_2$ is preferably twice as long as the duration of a Data In block. As a result of the application of the coefficients $A_2$ by the second finite filter 108, the ghost in the output from the second pre-processor 104 is eliminated.

The coefficients $c_1$ applied by the first post-processor 110 may be discrete steps shown by way of example in FIG. 17. Each of these steps has a width along the time axis equal to the interval d. Also, $\alpha$, which is the ratio of the amplitude of any one step to the amplitude of the next succeeding step in the case of the coefficients $c_1$, is preferably less than one. In the example shown in FIG. 17, a is 0.8. Moreover, the coefficients $c_1$ are applied as a block to the output of the first finite filter 106 and, therefore, the difference between $t_0$ at the beginning of the block of coefficients $c_1$ and $t_c$ at the end of the block of coefficients $c_1$ is commensurate with the length in time of a Data In block. The difference between $t_0$ and $t_c$ is not required to include the interval d because the ghost has already been eliminated. For example, if a Data In block has a duration of 256 samples times, then the difference between $t_0$ and $t_c$ is also 256 sample times. In addition, there should be an appropriate number of zeros on each side of the block of coefficients $c_1$. The coefficients $c_1$ reverse the modulation imposed on the received main signal by application of the coefficients $b_1$. The coefficients $c_1$ also provide a window function so that a Data Out block at the output of the first finite filter 106 has a duration which substantially matches the duration of a Data In block. Accordingly, the number of impulses in the response of the first finite filter 106 need not be infinite in order to eliminate a 100% ghost, but may instead be up to twice the data length.

The coefficients $c_2$ applied by the second post-processor 112 are substantially the time reverse of the coefficients $c_1$ and may be discrete steps shown by way of example in FIG. 18. Each of these steps has a width along the time axis equal to the interval d. Also, $1/\alpha$, which is the ratio of the amplitude of any one step to the amplitude of the next succeeding step in the case of the coefficients $c_2$, is preferably greater than one. In the example shown in FIG. 18, $1/\alpha$ is 1.25. Moreover, the coefficients $C_2$ are applied as a block to the output of the second finite filter 108 and, therefore, the difference between $t_0$ at the beginning of the block of coefficients $c_2$ and $t_c$ at the end of the block of coefficients $c_2$ is commensurate with the length in time of a Data In block. The difference between $t_0$ and $t_c$ is not required to include the interval d which, as discussed above, is the length of time separating the received main signal and its ghost, because the ghost has already been eliminated. For example, if a Data In block has a duration of 256 samples times, then the difference between $t_0$ and $t_c$ is also 256 sample times. In addition, there should be an appropriate number of zeros on each side of the block of coefficients $c_2$. The coefficients $c_2$ reverse the modulation imposed on the received main signal by application of the coefficients $b_2$. The coefficients $c_2$ also provide a window function so that a Data Out block at the output of the second finite filter 108 has a duration which substantially matches the duration of a Data In block. Accordingly, the number of impulses in the response of the second finite filter 108 need not be infinite in order to eliminate a 100% ghost, but may instead be up to twice the data length.

The coefficients $b_1$, $b_2$, $c_1$, and $c_2$ as described above in relation to FIGS. 9, 10, 17, and 18 generally require a priori knowledge of the interval d. The coefficients $b_1$, $b_2$, $c_1$, and $c_2$ described below in relation to FIGS. 22–25 require no a priori knowledge of the interval d. The curve for the coefficients $b_1$ as shown by way of example in FIG. 22 is such that the ratio of the amplitude of the curve at any point x1 along the time axis to the amplitude of the curve at a point x2 is the constant $\alpha$, where x1 and x2 are separated by the interval d, where the interval d may have any value, and where x2 occurs earlier along the time axis than x1. The constant $\alpha$ is preferably less than one. In the example shown in FIG. 22, $\alpha$ is 0.8. Moreover, as before, the coefficients $b_1$ are applied as a block to a Data In block and, therefore, the difference between $t_0$ at the beginning of the curve and $t_{b+d}$ at the end of the curve is commensurate with the length in time of a Data In block plus the interval d. In addition, there should be an appropriate number of zeros on each side of the block of coefficients $b_1$.

The curve for the coefficients $b_1$ as shown in FIG. 22 is given by the following equation:

$$b = k_0 \alpha^{-\frac{x}{k_1}} \tag{1}$$

where x is a point along the time axis between $t_0$ and $t_{b+d}$, $\alpha$ is as described above, $k_0$ is a constant such that b has a desired value at the point $t_0$, and $k_1$ may be any desired number.

The curve for the coefficients $b_2$ as shown by way of example in FIG. 23 is such that the ratio of the amplitude of the curve at any point x1 along the time axis to the amplitude of the curve at a point x2 is the constant $1/\alpha$, where x1 and x2 are separated by the interval d, where the interval d may have any value, and where x2 occurs earlier along the time axis than x1. The constant $1/\alpha$ is preferably greater than one. In the example shown in FIG. 23, $1/\alpha$ is 1.25. Moreover, as before, the coefficients $b_2$ are applied as a block to a Data In block and, therefore, the difference between $t_0$ at the beginning of the curve and $t_{b+d}$ at the end of the curve is commensurate with the length in time of a Data In block plus the interval d. In addition, there should be an appropriate number of zeros on each side of the block of coefficients $b_2$.

The curve for the coefficients $b_2$ as shown in FIG. 23 is given by the following equation:

$$b = k_0 \alpha^{\frac{x}{k_1}} \quad (2)$$

where x is a point along the time axis between $t_0$ and $t_{b+d}$, $\alpha$ is as described above, $k_0$ is a constant such that b has a desired value at the point $t_0$ and $k_1$ may be any desired number.

The curve for the coefficients $c_1$ as shown by way of example in FIG. 24 is characterized in that the ratio of the amplitude of the curve at any point x1 along the time axis to the amplitude of the curve at a point x2 is $\alpha$, where x1 and x2 are separated by the interval d, where the interval d may be any value, and where x1 occurs earlier along the time axis than x2. As shown in FIG. 24, $\alpha$ is 0.8. As before, the coefficients $c_1$ are applied as a block to the output of the first finite filter 106 and, therefore, the difference between $t_0$ at the beginning of the block of coefficients $c_2$ and $t_c$ at the end of the block of coefficients $c_2$ is commensurate with the duration of a Data In block. The difference between $t_0$ and $t_c$ is not required to include the interval d because the ghost has already been eliminated. In addition, there should be an appropriate number of zeros on each side of the block of coefficients $c_1$. The coefficients $c_1$ reverse the modulation imposed on the signal by application of the coefficients $b_1$. Also, as discussed above, the coefficients $c_1$ provide a window function so that a Data Out block at the output of the first finite filter 106 has a duration that substantially matches the duration of a corresponding Data In block.

The curve for the coefficients $c_1$ as shown in FIG. 24 is given by the following equation:

$$c = k_0 \alpha^{\frac{x}{k_1}} \quad (3)$$

where x is a point along the time axis between $t_0$ and $t_c$, $\alpha$ is as described above, $k_0$ is a constant such that c has a desired value at the point $t_0$, and $k_1$ may be any desired number.

The curve for the coefficients $c_2$ as shown by way of example in FIG. 25 is such that the ratio of the amplitude of the curve at any point x1 along the time axis to the amplitude of the curve at a point x2 is $1/\alpha$, where x1 and x2 are separated by the interval d, where the interval d may be any value, and where x1 occurs earlier along the time axis than x2. As shown in FIG. 25, $\alpha$ is 0.8. As before, the coefficients $c_2$ are applied as a block to the output of the second finite filter 108 and, therefore, the difference between $t_0$ at the beginning of the block of coefficients $c_2$ and $t_c$ at the end of the block of coefficients $c_2$ is commensurate with the duration of a Data In block. The difference between $t_0$ and $t_c$ is not required to include the interval d because the ghost has already been eliminated. In addition, there should be an appropriate number of zeros on each side of the block of coefficients $c_2$. The coefficients $c_2$ reverse the modulation imposed on the signal by application of the coefficients $b_2$. Also, as discussed above, the coefficients $c_2$ provide a window function so that a Data Out block at the output of the second finite filter 108 has a duration that substantially matches the duration of a corresponding Data In block.

The curve for the coefficients $c_2$ as shown in FIG. 25 is given by the following equation:

$$c = k_0 \alpha^{-\frac{x}{k_1}} \quad (4)$$

where x is a point along the time axis between $t_0$ and $t_c$, $\alpha$ is as described above, $k_0$ is a constant such that c has a desired value at the point $t_0$, and $k_1$ may be any desired number.

As discussed above, the outputs of the first and second post-processors 110 and 112 are added by the adder 120 so that the ghost free main signal emerging from the adder 120 has about twice the amplitude and four times the power of the ghost free main signal emerging from just one of the first and second paths 114 and 116. By contrast, any received noise, which is less correlated in the first and second paths 114 and 116 than the ghost free main signals, adds to a lesser extent that does the ghost free main signals. Accordingly, although each of the outputs of the first and second post-processors 110 and 112 is a solution to the 100% ghost problem and could be used alone to adequately deal with ghosts up to and including a 100% ghost, the signal to noise ratio of a dual path equalizer is improved over a single path equalizer.

FIG. 29 shows an example of a received main signal 140 and its ghost 142. As shown in FIG. 29, the received main signal 140 and its ghost 142 may have non-overlap regions 144 and 146 where they do not overlap and an overlap region 148 where they do overlap. Noise at the outputs of the first and second paths 114 and 116 tend to be more correlated in the overlap region 148 and less correlated in the non-overlap regions 144 and 146. A dual path equalizer 150 in accordance with a second embodiment of the present invention is shown in FIG. 26 and is arranged to use this difference in noise correlation in order to enhance signal to noise performance.

The dual path equalizer 150 includes first and second pre-processors 152 and 154, first and second finite filters 156 and 158, first and second post-processors 160 and 162, and first and second multipliers 164 and 166. The first pre-processor 152, the first finite filter 156, the first post-processor 160, and the first multiplier 164 form a first path 168 of the dual path equalizer 150, and the second pre-processor 154, the second finite filter 158, the second post-processor 162, and the second multiplier 166 form a second path 170 of the dual path equalizer 150. The first and second pre-processors 152 and 154, the first and second finite filters 156 and 158, and the first and second post-processors 160 and 162 are controlled by a controller 172.

The first and second pre-processors 152 and 154, the first and second finite filters 156 and 158, and the first and second post-processors 160 and 162 of the dual path equalizer 150 function in the same way and apply the same coefficients as the corresponding first and second pre-processors 102 and 104, first and second finite filters 106 and 108, and first and second post-processors 110 and 112 of to the dual path equalizer 100. Also, the controller 172 of the dual path equalizer 150 functions in the same manner as the controller 118 of the dual path equalizer 100.

However, the first multiplier 164 multiplies the output of the first post-processor 160 by coefficients $c_1'$, and the second multiplier 166 multiplies the output of the second post-processor 162 by coefficients $c_2'$. The outputs from the first and second multipliers 164 and 166 are added by an adder 174 to produce output data which is ghost free and has reduced noise enhancement.

In the case of a 100% ghost, the coefficients $c_1'$ applied by the first multiplier 164 may be a straight line with a slope of −1/Data-Length as shown in FIG. 27, and the coefficients $c_2'$ applied by the second multiplier 166 may be a straight line with a slope of +1/Data-Length as shown in FIG. 28. The coefficients $c_1'$ provide a window function having a duration which substantially matches the duration of a Data In block, and the coefficients $c_2'$ provide a window function having a duration which substantially matches the duration of a Data In block.

Because the coefficients $c_1'$ applied in the first path 168 have magnitudes which are greater in the non-overlap region 144, both the received main signal and noise at output of the first post-processor 160 are enhanced in the non-overlap region 144. Similarly, because the coefficients $c_2'$ applied in the second path 170 have magnitudes which are greater in the non-overlap region 146, both the received main signal and noise at output of the second post-processor 162 are enhanced in the non-overlap region 146. However, because the noise in the non-overlap regions 144 and 146 are less correlated than the received main signal, adding the received main signals and noise in the adder 174 strengthens the more correlated received main signal compared to the less correlated noise with the result that the signal to noise ratio is improved.

The coefficients $c_1'$ and $c_2'$ could have other shapes. Also, because a received ghost could be other than a 100% ghost, the coefficients $c_1'$ and $c_2'$ may be shaped in accordance with the size of the ghost. In this case, the controller 172 estimates the size of the ghost as compared to the received main signal and either computes the coefficients $c_1'$ and $c_2'$ based upon this estimated relationship or selects the coefficients $c_1'$ and $c_2'$ from memory based upon this estimated relationship.

Moreover, the coefficients $c_1'$ applied by the first multiplier 164 can be combined with the coefficients $c_1$ applied by the first post-processor 160 so that the first multiplier 164 and the first post-processor 160 are provided as a single element applying a single set of coefficients, and the coefficients $c_2'$ applied by the second multiplier 166 can be combined with the coefficients $c_2$ applied by the second post-processor 162 so that the second multiplier 166 and the second post-processor 162 are provided as a single element applying a single set of coefficients.

Two embodiments of a dual path equalizer in accordance with the present invention have been discussed above. However, other embodiments of a dual path equalizer in accordance with the present invention are possible. For example, each path of a dual path equalizer may contain a pre-processor which multiplies the received main signal and its ghost by the coefficients b, a finite filter comprising a Fast Fourier Transform and a multiplier which multiplies the frequency domain output of the Fast Fourier Transform by the complex coefficients A such as those described above, and a convolver which convolves the output of the corresponding multiplier with the coefficients C in order to recover the data that was transmitted through the channel. The coefficients C in this case may be complex.

Certain modifications and alternatives of the present invention have been discussed above. Other modifications and alternatives will occur to those practicing in the art of the present invention. For example, because the present invention operates most satisfactorily in the presence of ghosts and other linear distortions, the term ghost as used herein in connection with the present invention includes ghosts and/or other linear distortions.

Moreover, the coefficients b have been shown above as non-complex coefficients. However, the coefficients b may be complex.

Specific exemplary values for the coefficients $b_1$, $a_1$, $c_1$, $b_2$, $a_2$, and $c_2$ have been shown above in relation to FIGS. 9–18 and 22–25. Other values could be used. Also, these values have been selected to deal with the case of a 100% ghost. If the received ghost is less than 100%, other values for the coefficients $b_1$, $a_1$, $c_1$, $b_2$, $a_2$, and $c_2$ could be used. In this case, the controller 118 may be arranged to determine the ratio of the ghost in relation to the received main signal and to either calculate the coefficients $b_1$, $a_1$, $c_1$, $b_2$, $a_2$, and $c_2$ or select the coefficients $b_1$, $a_1$, $c_1$, $b_2$, $a_2$, and $c_2$ from a memory based upon the ratio.

Furthermore, the invention has been described above as if a single ghost is received. In the case where multiple ghosts are received, it may be desirable to apply multiple sets of the coefficients $b_1$, $a_1$, $c_1$, $b_2$, $a_2$, and $c_2$ to the received signal or a single set tailored for multiple ghosts. Also, the spacing between the coefficients $a_1$ and $a_2$ is described above as being the interval d. However, in the case where the interval d is not evenly divisible into the block length of a data block, or in the case where more than one ghost are received, the spacing between the coefficients $a_1$ and $a_2$ may be other than the interval d.

The guard interval discussed above may have any desired values including zero.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A dual path equalizer for processing blocks of data comprising:

a first pre-processor, wherein the first pre-processor applies coefficients $b_1$ to a received signal;

a first finite filter, wherein the first finite filter applies coefficients $a_1$ to an output of the first pre-processor in order to substantially eliminate a ghost from the received signal;

a first post-processor, wherein the first post-processor applies coefficients $c_1$ to an output of the first finite filter;

a second pre-processor, wherein the second pre-processor applies coefficients $b_2$ to the received signal, and wherein the coefficients $b_2$ are substantially the time reverse of the coefficients $b_1$;

a second finite filter, wherein the second finite filter applies coefficients $a_2$ to an output of the second pre-processor in order to substantially eliminate a ghost from the received signal, and wherein the coefficients $a_2$ are substantially the time reverse of the coefficients $a_1$;

a second post-processor, wherein the second pre-processor applies coefficients $c_2$ to an output of the second finite filter, and wherein the coefficients $c_2$ are substantially the time reverse of the coefficients $c_1$; and, an adder arranged to add outputs from the first and second post-processors.

2. The dual path equalizer of claim 1 wherein the first and second finite filters are time domain finite filters.

3. The dual path equalizer of claim 2 wherein the time domain first and second finite filters comprise respective FIR filters.

4. The dual path equalizer of claim 1 wherein the first and second finite filters are frequency domain finite filters.

5. The dual path equalizer of claim 4 wherein the frequency domain first and second finite filters each comprises at least a Fast Fourier Transform arranged to transform the received signal to the frequency domain and a multiplier arranged to multiply the received signal by coefficients to substantially eliminate the ghost from the received signal.

6. The dual path equalizer of claim 1 wherein the coefficients $b_1$, $b_2$, $c_1$, and $c_2$ comprise corresponding window functions, wherein the window functions for the coefficients $b_1$ and $b_2$ have respective durations substantially equal to a duration of a block of data plus a temporal separation between a main signal and a ghost of the main signal, and wherein the window functions for the coefficients $c_1$ and $c_2$ have respective durations substantially equal to a duration of a block of data.

7. The dual path equalizer of claim 1 wherein the coefficients $b_1$ and $b_2$ each comprise steps of different magnitudes, and wherein the coefficients $c_1$ and $c_2$ each comprise steps of different magnitudes.

8. The dual path equalizer of claim 7 wherein each of the steps has a length in time substantially equal to a temporal separation between a main signal of the received signal and the ghost, and wherein a ratio of the magnitude of one of the steps to the magnitude of an adjacent step is unequal to one.

9. The dual path equalizer of claim 7 wherein the steps of the coefficients $b_1$ and $c_1$ having oppositely changing magnitudes.

10. The dual path equalizer of claim 1 wherein the coefficients $b_1$, $b_2$, $c_1$, and $c_2$ each comprise an exponential curve.

11. The dual path equalizer of claim 10 wherein the exponential curves of the coefficients $b_1$ and $c_1$ have oppositely changing magnitudes.

12. The dual path equalizer of claim 1 further comprising a first multiplier between the first post-processor and the adder and a second multiplier between the second post-processor and the adder, wherein the first multiplier applies coefficients $c_1'$ to an output of the first post-processor, wherein the second multiplier applies coefficients $c_2'$ to an output of the second post-processor, and wherein the coefficients $c_2'$ are substantially the time reverse of the coefficients $c_1'$.

13. The dual path equalizer of claim 12 wherein the coefficients $c_1'$ and $c_2'$ are arranged to enhance the correlated main signal and to reduce correlated noise.

14. The dual path equalizer of claim 12 wherein the coefficients $c_1'$ are combined with the coefficients $c_1$ to form a set of coefficients, and wherein the coefficients $c_2'$ are combined with the coefficients $c_2$ to form a single set of coefficients.

15. The dual path equalizer of claim 1 wherein the coefficients $a_1$ and $a_2$ are complex coefficients.

16. The dual path equalizer of claim 1 wherein the coefficients $a_1$ and $a_2$ are real coefficients.

17. The dual path equalizer of claim 1 wherein the coefficients $b_1$ and $b_2$ are arranged to make a main signal of the received signal and the ghost unequal.

18. The dual path equalizer of claim 17 wherein the coefficients $b_1$ and $b_2$ each comprise steps of different magnitudes.

19. The dual path equalizer of claim 18 wherein the coefficients $c_1$ and $c_2$ each comprise steps of different magnitudes.

20. The dual path equalizer of claim 17 wherein the coefficients $b_1$ and $b_2$ each comprise an exponential curve.

21. The dual path equalizer of claim 20 wherein the coefficients $c_1$ and $c_2$ each comprise an exponential curve.

22. The dual path equalizer of claim 17 wherein the coefficients $c_1$ and $c_2$ are arranged to remove the modulation introduced by the first and second pre-processors.

23. The dual path equalizer of claim 1 wherein the coefficients $c_1$ and $c_2$ are arranged to remove a modulation introduced by the first and second pre-processors.

24. The dual path equalizer of claim 1 wherein the coefficients $a_1$ and $a_2$ each have a duration which is longer than the duration of a data block.

25. The dual path equalizer of claim 1 wherein the coefficients $a_1$ and $a_2$ each have a duration which is less than or equal to twice the duration of a data block.

26. A dual path equalizer for processing blocks of data comprising:

a first pre-processor, wherein the first pre-processor applies coefficients $b_1$ to a received signal;

a first finite filter, wherein the first finite filter applies coefficients $a_1$ to an output of the first pre-processor in order to substantially eliminate a ghost from the received signal;

a first post-processor, wherein the first post-processor applies coefficients $c_1$ to an output of the first finite filter;

a second pre-processor, wherein the second pre-processor applies coefficients $b_2$ to the received signal, and wherein $b_2 \neq b_1$;

a second finite filter, wherein the second finite filter applies coefficients $a_2$ to an output of the second pre-processor in order to substantially eliminate a ghost from the received signal, and wherein $a_2 \neq a_1$;

a second post-processor, wherein the second post-processor applies coefficients $c_2$ to an output of the second finite filter, and wherein $c_1 \neq c_2$; and, an adder arranged to add outputs from the first and second post-processors.

27. The dual path equalizer of claim 26 wherein the coefficients $b_1$, $b_2$, $c_1$, and $c_2$ comprise corresponding window functions, wherein the window functions for the coefficients $b_1$ and $b_2$ have respective durations substantially equal to a duration of a block of data plus a temporal separation between a main signal and a ghost of the main signal, and wherein the window functions for the coefficients $c_1$ and $c_2$ have respective durations substantially equal to a duration of a block of data.

28. The dual path equalizer of claim 27 wherein the coefficients $b_1$ and $b_2$ each comprise steps of different magnitudes, wherein the coefficients $c_1$ and $c_2$ each comprise steps of different magnitudes, wherein one of the steps of the coefficients $b_1$ and $b_2$ are ascending steps, wherein the other of the steps of the coefficients $b_1$ and $b_2$ are descending steps, wherein one of the steps of the coefficients $c_1$ and $c_2$ are ascending steps, and wherein the other of the steps of the coefficients $c_1$ and $c_2$ are descending steps.

29. The dual path equalizer of claim 28 wherein each of the steps of the coefficients $b_1$, $b_2$, $c_1$, and $c_2$ has a length in time substantially equal to a temporal separation between a main signal of the received signal and the ghost.

30. The dual path equalizer of claim 27 wherein the coefficients $b_1$, $b_2$, $c_1$, and $c_2$ each comprise an exponential curve, wherein the exponential curves of the coefficients $b_1$ and $b_2$ have oppositely changing slopes, and wherein the exponential curves of the coefficients $c_1$ and $c_2$ have oppositely changing slopes.

31. The dual path equalizer of claim 26 further comprising a first multiplier between the first post-processor and the adder and a second multiplier between the second post-processor and the adder, wherein the first multiplier applies coefficients $c_1'$ to an output of the first post-processor, wherein the second multiplier applies coefficients $c_2'$ to an output of the second post-processor, and wherein $c_2' \neq c_1'$.

32. The dual path equalizer of claim 31 wherein the coefficients $c_1'$ and $c_2'$ are arranged to enhance the correlated main signal and to reduce correlated noise.

33. The dual path equalizer of claim 31 wherein the coefficients $c_1'$ are combined with the coefficients $c_1$ to form a set of coefficients, and wherein the coefficients $c_2'$ are combined with the coefficients $c_2$ to form a single set of coefficients.

34. The dual path equalizer of claim 31 wherein one of the coefficients $c_1$ and $c_1'$ has a positive slope, wherein the other of the coefficients $c_1$ and $c_1'$ has a negative slope, wherein one of the coefficients $c_2$ and $c_2'$ has a positive slope, and wherein the other of the coefficients $c_2$ and $c_2'$ has a negative slope.

35. The dual path equalizer of claim 26 wherein the coefficients $b_1$ and $b_2$ are arranged to make a main signal of the received signal and the ghost unequal.

36. The dual path equalizer of claim 35 wherein the coefficients $b_1$ and $b_2$ each comprise steps of different magnitudes, and wherein each of the steps has a duration substantially equal to a temporal separation between the main signal and the ghost.

37. The dual path equalizer of claim 35 wherein the coefficients $b_1$ and $b_2$ each comprise an exponential curve.

38. The dual path equalizer of claim 35 wherein the coefficients $c_1$ and $c_2$ are arranged to remove the modulation introduced by the first and second pre-processors.

39. The dual path equalizer of claim 26 wherein the coefficients $a_1$ and $a_2$ each have a duration which is less than or equal to twice the duration of a data block.

40. A method of substantially eliminating a ghost of a received main signal and reducing noise enhancement comprising the following steps:
   a) processing the received main signal and the ghost along a first path so as to substantially eliminate the ghost;
   b) processing the received main signal and the ghost along a second path so as to substantially eliminate the ghost, wherein the processing along the first path and the processing along the second path are arranged so as to maintain the received main signal in the first and second paths correlated and to maintain noise in the first and second paths at least partially uncorrelated; and,
   c) adding the correlated received main signals and the at least partially uncorrelated noise from the first and second paths.

41. The method of claim 40 wherein the processing of step a) is arranged to produce a first path output having a first signal to noise ratio, wherein the processing of step b) is arranged to produce a second path output having a second signal to noise ratio, and wherein the processing of step c) is arranged to produce an equalizer output having an output signal to noise ratio that is greater than either the first or the second signal to noise ratio.

42. The method of claim 40 wherein step a) comprises the step of applying coefficients $b_1$, then coefficients $a_1$, then coefficients $c_1$ to the received main signal and the ghost along the first path, wherein step b) comprises the step of applying coefficients $b_2$, then coefficients $a_2$, then coefficients $c_2$ to the received main signal and the ghost along the second path, wherein $b_1$ is substantially the time reverse of $b_2$, wherein $a_1$ is substantially the time reverse of $a_2$, wherein $c_2$ is substantially the time reverse of $c_1$, wherein the coefficients $b_1$, $b_2$, $c_1$, and $c_2$ are corresponding window functions, and wherein the coefficients $a_1$ and $a_2$ are arranged to substantially eliminate the ghost in the corresponding first and second paths.

43. The method of claim 42 wherein the window functions for the coefficients $b_1$ and $b_2$ have respective durations substantially equal to a duration of a block of data plus a temporal separation between a main signal and a ghost of the main signal, and wherein the window functions for the coefficients $c_1$ and $c_2$ have respective durations substantially equal to a duration of a block of data.

44. The method of claim 42 wherein the coefficients $b_1$ and $c_1$ have oppositely changing magnitudes.

45. The method of claim 42 wherein step a) further comprises the step of applying coefficients $c_1'$ after the application of the coefficients $c_1$, wherein step b) further comprises the step of applying coefficients $c_2'$ after the application of the coefficients $c_2$, and wherein $c_2'$ is substantially the time reverse of $c_1'$.

46. The method of claim 40 wherein the coefficients $b_1$ and $b_2$ are arranged to modulate the amplitude of the ghost relative to received main signal.

47. The method of claim 46 wherein the coefficients $c_1$ and $c_2$ are arranged to remove the modulation of the received main signal introduced by the coefficients $b_1$ and $b_2$.

* * * * *